Dec. 3, 1946.   E. C. FREISEN   2,412,038
RETRACTABLE TOOL HOLDING MEANS
Filed Aug. 12, 1944
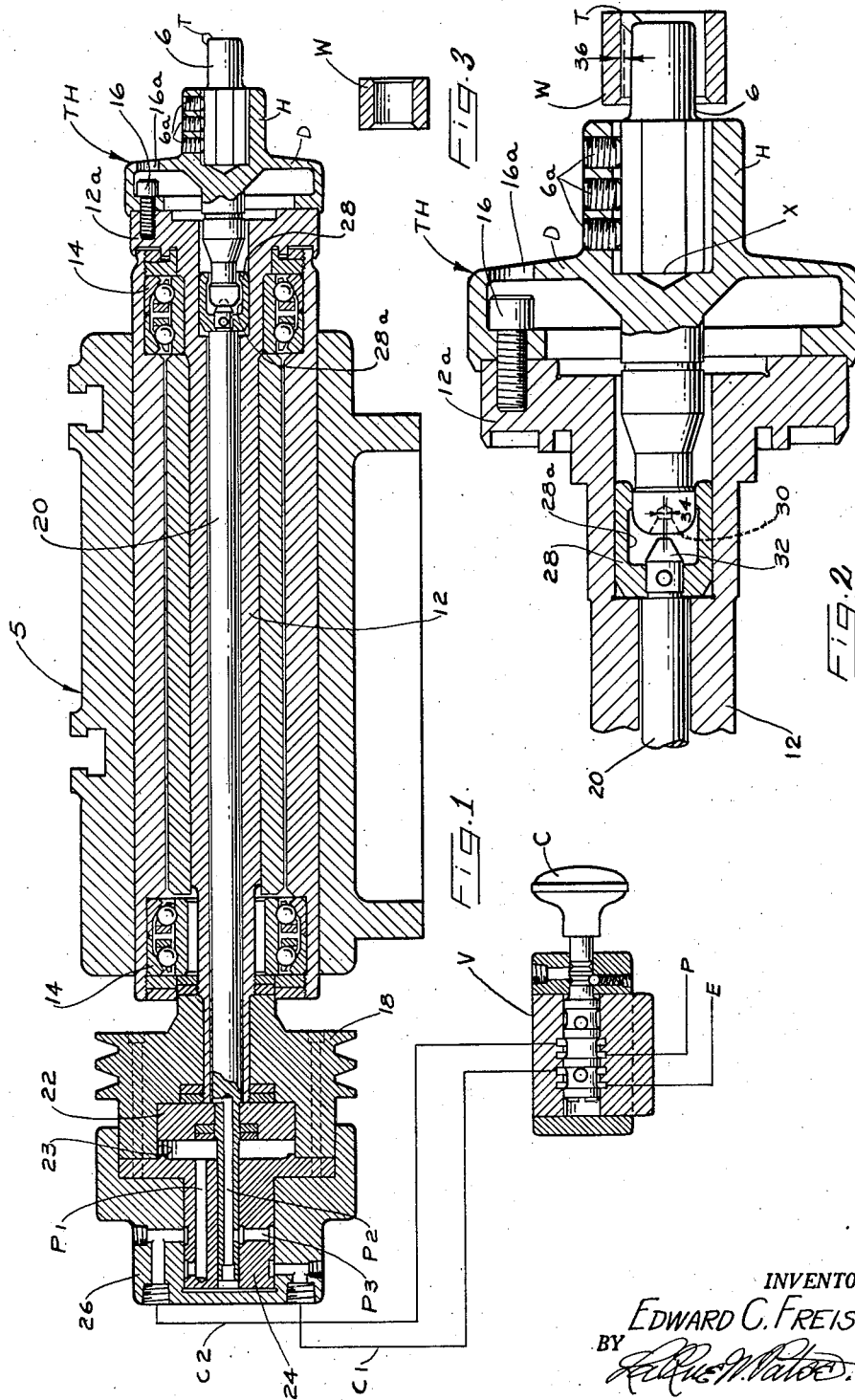
INVENTOR.
EDWARD C. FREISEN
BY
ATTORNEY Patented Dec. 3, 1946

2,412,038

UNITED STATES PATENT OFFICE 2,412,038

RETRACTABLE TOOL HOLDING MEANS

Edward C. Freisen, Detroit, Mich., assignor to Ex-Cell-O Corporation, Detroit, Mich., a corporation of Michigan Application August 12, 1944, Serial No. 549,261

7 Claims. (Cl. 77—3)

The present invention pertains to a retractable tool holding means.

The principal object of my invention is to provide a holder for a fly cutting boring tool constructed and arranged to place the tool alternatively in two possible positions and to cause the cutter thereof, when in a cutting position, to have a predetermined radius of rotation and, when in a non-cutting position, to have a lesser radius of rotation. The second or retracted radius of rotation may differ from the cutting radius by a minute distance, usually only a fraction of one thousandth of an inch or a few thousandths of an inch, to cause the point of the cutter to radially retract from or clear the finished surface of the bored workpiece so that, in the reverse axial movement between the workpiece and the tool which takes place during withdrawal of the tool (or the work) following a boring operation, the point of the cutting tool cannot contact the finished bore to mar or scratch the latter.

Another object of my invention is to permit the cutting tool to be shifted from one to another of its two positions whether or not the boring tool is rotating and, in instances where it is more convenient to rotate the workpiece than to rotate the tool, the tool may be alternatively placed in a cutting or non-cutting position at will, though the tool holder be non-rotatable.

A structure including my improved tool holding means is clearly illustrated in the following drawing in which;

Fig. 1 is a longitudinal sectional view of a boring spindle including a retractable tool holding means embodying the features of my invention.

Fig. 2 is a fragmentary cross sectional view including my tool holding means drawn to larger scale for clarity; and Fig. 3 is a sectional view through a bushing illustrative of one simple form of workpiece which may advantageously be bored by the embodiment of my invention herein illustrated.

Referring more particularly to the drawing, the improved tool holding means may be incorporated in a spindle 5 substantially of the structure described in United States Patent No. 2,012,677, issued August 27, 1935, to Carroll R. Alden, and including precision antifriction spindle bearings of the sort illustrated in method Patent 1,708,491, issued April 9, 1929, to the said Alden.

The spindle shaft 12 is supported for rotation in the structure 5 on the bearings 14 and is formed at its forward end with a face plate member 12a for rotatably supporting the retractable tool holding means TH which is preferably fastened thereto by three equally spaced screws 16 insertable through holes 16a. At the rear end of shaft 12 is fixed a spindle shaft driving member 18 which may well include V belt grooves adapted to be driven from a conventional V belt pulley on a suitable motor, not shown.

While my retractable tool holding means may be alternatively placed in its cutting or retracted position by any convenient mechanism either manually or power actuated, I shall here describe an hydraulically actuated means which may be preferable when my invention is used in association with an hydraulically actuated machine.

Shaft 12 is hollow and surrounds a rod 20 axially movable therein by its connection with piston 22 which is reciprocable in cylinder bore 23 formed in member 18. The rearward face of piston 22 is continuously in communication with passage $P_1$ formed in swivel connector member 24 which is fixed to and rotatable with member 18, the member 24 being rotatable in non-rotatable connector member 26. Member 24 is formed with a central axial bore which fittingly encircles a reduced diameter rear end portion of rod 20 containing passage $P_2$ which communicates with the forward face of piston 22. Rod 20 may move axially in member 24 with movement of piston 22 in its bore 23. Through swivel connector member 24, passage $P_2$ is in constant communication with passage $P_3$ and conduit $C_2$, also through this swivel connection, conduit $C_1$ is continuously maintained in communication with passages $P_1$. Conduits $C_1$, $C_2$ may be alternatively connected with a supply of hydraulic fluid under pressure P or with exhaust E through conventional two-way valve V which may be actuated by handle C. Piston 22 may thus be caused to have fluid under pressure applied alternatively to either of its faces.

The forward end of rod 20 is formed with a frustro-conical end 32 having its axis coinciding with rod 20 and shaft 12. The frustro-conical end of the rod is surrounded by an annular member 28 fixedly pinned to the rod and axially reciprocable therewith in a suitable enlarged guide bore formed in the forward end of shaft 12.

The tool holding means TH, when a section on one side of the axial centerline is considered, is seen to be of U shaped cross section supporting a central hub portion H which, at its forward end, is provided with an axial bore in which removable boring bars 6 of various selected lengths and held as by set screws 6a may support a tool T with its cutting point at a predetermined radial distance from the axis of the boring bar 6.

The U shaped cross section of the holder TH between its supported surface abutting face plate 12a and the hub portion H, especially the diaphragm portion D, is deformable.

When the rod 20 is withdrawn to its rearmost position as shown in Fig. 2, the annular member 28 centralizes the rear portion of the hub member H and preferably causes the axes of boring bar 6, tool holder TH, rod 20 and shaft 12 all to lie in a single straight line. Though any convenient means may be used to move the rearmost end of hub H, in the present instance rod 20 is caused to have it forwardmost position, as shown in Fig. 1, upon appropriate application of hydraulic pressures on piston 22. In the illustrated structure the central recessed bore 28a then surrounds the acorn shaped rear end of hub H with a suitable clearance therebetween. The rearmost end of hub H is formed with an internal frustro-conical surface 30 having the axis thereof slightly eccentrically displaced from the axis of hub H and boring bar 6 as illustrated to an exaggerated scale by the dimension 34. When the conical end 32 is forced into the conical recess 30, as shown in Fig. 1, its eccentric axis is elevated into coincidence with the true axis of spindle 12 causing deformation of the diaphragm portion D which retracts the tool T by shortening the radial distance from the cutting point of tool T to the true axis of rotation of shaft 12 thus causing tool T to describe a smaller circle of revolution than it describes when the tool is in its non-retracted boring position, as shown in Fig. 2. Because of the small magnitude of the change in radial distance of the tool T between its cutting and its retracted position, the workpiece W of Fig. 3 has been fragmentarily shown in Fig. 2 in relation to the tool T, and an exaggerated dimension 36 has been applied between the finish bored internal diameter of the workpiece and the dotted line indicating the boundary line of tool rotation in the retracted position. The axis of the hub H and boring bar 6 being considered to pivot over the point when the diaphragm D is reflected by placing the parts in the position shown in Fig. 1.

To insure that the tool T will always have its normal cutting radius of rotation when table 2 is moving in its forward or feeding direction, it is sometimes preferable, especially when my invention is incorporated in an hydraulically actuated machine, to omit the control valve V and connect the conduits $C_1$, $C_2$ with like hydraulic conduits (not shown) which alternatively supply or discharge fluid under pressure for the hydraulic actuator of machine table (not shown) in such manner that piston 22 is forced to its rearmost position when table moves toward the tool T and is forced to its retracted position as shown in Fig. 1 when the table moves away from the tool T.

It will be apparent that my improved retractable tool holder is susceptible to many modifications and alternative constructions including changes in size, shape, means of actuation and arrangement of its parts without departing from the spirit of my invention and I do not intend to limit the scope thereof in any way other than by the appended claims.

I claim as my invention:

1. In a retractable tool holding means, a principal support, a deformable diaphragm member rigidly fixed to said principal support adjacent an extremity of said deformable member and having a flexible portion, a hub supported by the flexible portion of said deformable member substantially normally thereto and spaced from said supported extremity thereof, a tool member carried by an extension of said hub on one side of said deformable member, an opposing extension of said hub on the other side of said member, and means for laterally moving the extremity of said opposing hub extension relative to said principal support to control the deflection of said deformable member whereby to displace the axis of said hub.

2. In a retractable tool holding means, a principal support member, a deformable member of substantially circular disc shape fixed to said principal support member at a plurality of points adjacent the periphery of said deformable member, a hub member supported by said disc shaped deformable member substantially centrally thereof, a tool member carried by an extension of said hub member, an opposing extension of said hub member, and means for moving the extremity of said opposing hub extension relative to said principal support member to control the deformation of said deformable member whereby to displace the axis of said hub member.

3. In a retractable tool holding means, a hollow rotary machine spindle, a deformable member substantially of circular disc shape fixed to said machine spindle at a plurality of spaced points adjacent the periphery of said member and with the central axis of said member generally coincident with the axis of rotation of said spindle, a hub member supported by said deformable member substantially centrally thereof, a tool member carried by one end of said hub member, and means for moving the opposite end of said hub member relative to the axis of said spindle to control the deformation of said deformable member whereby to alter the radial distance from a point on said tool member to the axis of said spindle.

4. In a retractable tool holding means, a hollow rotary machine spindle, a deformable member substantially of circular disc shape fixed to said machine spindle at a plurality of spaced points adjacent the periphery of said member and with the central axis of said member generally coincident with the axis of rotation of said machine spindle, a hub member supported by said deformable member substantially centrally thereof, a tool member carried by one end of said hub member, a member axially movable in said hollow machine spindle, means effective upon axial movement of said last mentioned member in said spindle for moving the opposite end of said hub member to tilt the axis of said hub member relative to the axis of said spindle, and means for moving said axially movable member.

5. In a retractable tool holding means, a hollow rotary machine spindle, a deformable member fixed to said machine spindle, a hub member supported by said deformable member and having its axis substantially coincident with the said spindle axis and having axial extensions at both sides of said deformable member, a tool member carried by one end extension of said hub member, a member axially movable in said hollow machine spindle, cam means on said last mentioned member effective upon axial movement of said last mentioned member in said spindle for engaging the opposite end extension of said hub member to move said hub member relative to the axis of said spindle, and means for moving said axially movable member.

6. In a retractable tool holding means, a hollow rotary machine spindle, a tool supporting member rigidly secured to said spindle and having a central deformable diaphragm extending transversely of and in alignment with the spindle axis, the outer face of said diaphragm being formed with a socket adapted to receive an axially projecting tool member, the inner face of said diaphragm being formed with a central projection normally extending coaxially with said spindle, the inner end of said projection being formed with a frusto-conical recess defining a cam surface normally eccentric to the spindle axis, an actuating member extending axially through said spindle and having a conical end cam adapted for movement axially into and out of said recess respectively to deflect or release said projection and said diaphragm, and a concentric tubular guide on said member extending in telescopic relation with the inner end of said projection and movable into centering engagement therewith upon retraction of said cam from said recess.

7. In a retractable tool holding means, a hollow rotary machine spindle, a tool supporting member rigidly secured to said spindle and having a central deformable diaphragm extending transversely of and in alignment with the spindle axis, the outer face of said diaphragm being provided with means to support an outwardly projecting tool member, the inner face of said diaphragm being formed with a central projection normally extending coaxially with said spindle, the inner end of said projection being formed with a cam surface, an actuating member extending axially through said spindle and having an end cam surface adapted for movement into and out of engagement with said first mentioned surface respectively to laterally deflect or release said projection, and a guide on said member movable into engagement with said extension upon disengagement of said cam surfaces to insure positive location of said projection and diaphragm in normal position.

EDWARD C. FREISEN.